United States Patent [19]

Loomba

[11] 4,012,612
[45] Mar. 15, 1977

[54] SEAT BELT BUCKLE SWITCH ASSEMBLY HAVING SELF CLEANING CONTACTS

[75] Inventor: Yogendra Singh Loomba, Washington, Mich.

[73] Assignee: Allied Chemical Corporation, Morris Township, N.J.

[22] Filed: Nov. 6, 1975

[21] Appl. No.: 629,352

[52] U.S. Cl. .................. 200/61.58 B; 200/242; 200/253

[51] Int. Cl.$^2$ ............... H01H 3/16; H01H 1/60; A44B 19/00

[58] Field of Search .... 200/61.58 B, 164, 237–251, 200/253

[56] References Cited

UNITED STATES PATENTS

| | | | |
|---|---|---|---|
| 3,269,483 | 8/1966 | Garner, Jr. | 200/61.58 B X |
| 3,670,119 | 6/1972 | Gebhardt et al. | 200/61.58 B X |
| 3,833,781 | 9/1974 | Rumpf | 200/61.58 B X |
| 3,840,849 | 10/1974 | Lohr | 200/61.58 B X |
| 3,895,196 | 7/1975 | Lewis | 200/61.58 B |
| 3,911,236 | 10/1975 | Poulson | 200/61.58 B |

Primary Examiner—James R. Scott
Attorney, Agent, or Firm—John P. Kirby, Jr.

[57] ABSTRACT

An electric switch is disposed in a cavity of a buckle. The electric switch includes a stationary first contact member, a movable second contact member, a biasing means for the second contact member, and an actuating member. The biasing means biases the second contact member to the closed position of the electric switch. The electric switch has means by which the contact end portion of the second contact member makes a wiping, self-cleaning contact with the first contact member upon actuation by the actuating member. The actuating member, in turn, is actuated by a tongue of the buckle when the tongue is inserted into the buckle.

18 Claims, 5 Drawing Figures

SEAT BELT BUCKLE SWITCH ASSEMBLY HAVING SELF CLEANING CONTACTS

BACKGROUND OF THE INVENTION

The invention relates to an electric switch for uses such as in a buckle for a safety belt. Vehicle safety belts are used to restrain a seated occupant, either passenger or driver, in a vehicle, such as an automobile, during emergency conditions. More particularly, the electric switch includes a contact member which makes a wiping and self-cleaning contact with another contact member of the electric switch when the switch is opened and closed, thereby improving electric contact between the two contact members in the closed position of the switch. The electric switch is disposed in the buckle and opens when a tongue of the safety belt is inserted in the buckle of the safety belt. As a result, the electric switch indicates when a user, either driver or occupant of the vehicle, fastens the safety belt. A different type of electric switch for a safety belt buckle is disclosed in U.S. Patent application Ser. No. 629,354 filed concurrently with the present application in the name of A. Colasanti entitled "Electric Switch For Safety Belt Buckle". A different type of electric switch for a retractor for a vehicle safety belt is disclosed in U.S. Patent application Ser. No. 210,532 filed Dec. 21, 1971 in the name of F. C. Booth and entitled "Retractor With Switch", now U.S. Pat. No. 3,880,379.

SUMMARY OF THE INVENTION

An object of the present invention is to provide an electric switch which is adapted for use in a wide variety of buckles of the type including a switch cavity therein in which the electric switch is disposed. A second object of the present invention is to provide a switch which has a self-cleaning operation, thereby reducing malfunctions resulting, for example, from dirt or other matter forming in the electrical contact area of the switch. A third object of the present invention is to provide an electric switch which is small enough to fit in a limited space, such as a cavity of a buckle, which is simple and economical to manufacture and assemble, and which is durable in operation.

The electric switch of the present invention includes a stationary first contact member, a movable second contact member, a biasing means for the second contact member, and an actuating member. The stationary first contact member has a conductive portion and a non-conductive portion. The movable second contact member has an elongated shape, a movable contact end portion and a stationary mounting end portion. The electric switch has a closed position when the contact end portion of the second member is in contact with the conductive portion of the first contact member. The electric switch has an open position when the contact end portion of the second contact member is in contact with the non-conductive portion of the first contact member. The biasing means biases the second contact member to the closed position of the electric switch.

The contact end portion of the second contact member has motion which includes motion in a first plane, a second plane, and a third plane, while the contact end portion of the second contact member is moving between the closed position of said electric switch and the open position of said electric switch. The electric switch has means by which the contact end portion of the second contact member makes a wiping, self-cleaning contact with the first contact member upon actuation by the actuating member. The actuating member, in turn, is actuated by the tongue of the buckle when the tongue is inserted into the housing of the buckle.

DETAILED DESCRIPTION

The electrical switch of the present invention may, for example, be used in a buckle which has, or can be modified to have, a switch cavity therein. Examples of safety belt buckles which can easily be modified to provide a switch cavity therein are disclosed in U.S. Patent application Ser. No. 441,912 filed Feb. 12, 1974 in the name of Arden Poulsen, entitled "Laminated Buckle Housing", now U.S. Pat. No. 3,911,236; U.S. Patent application Ser. No. 441,913 filed Feb. 12, 1974 in the name of Dornis Levasseur, entitled "Buckle Housing", now U.S. Pat. No. 3,919,508; and U.S. Patent application Ser. No. 506,070 filed Sept. 16, 1974 in the name of Robert L. Stephenson, entitled "Safety Belt Buckle", now U.S. Pat. No. 3,969,795; each having a common assignee with the present invention.

Figure 1:
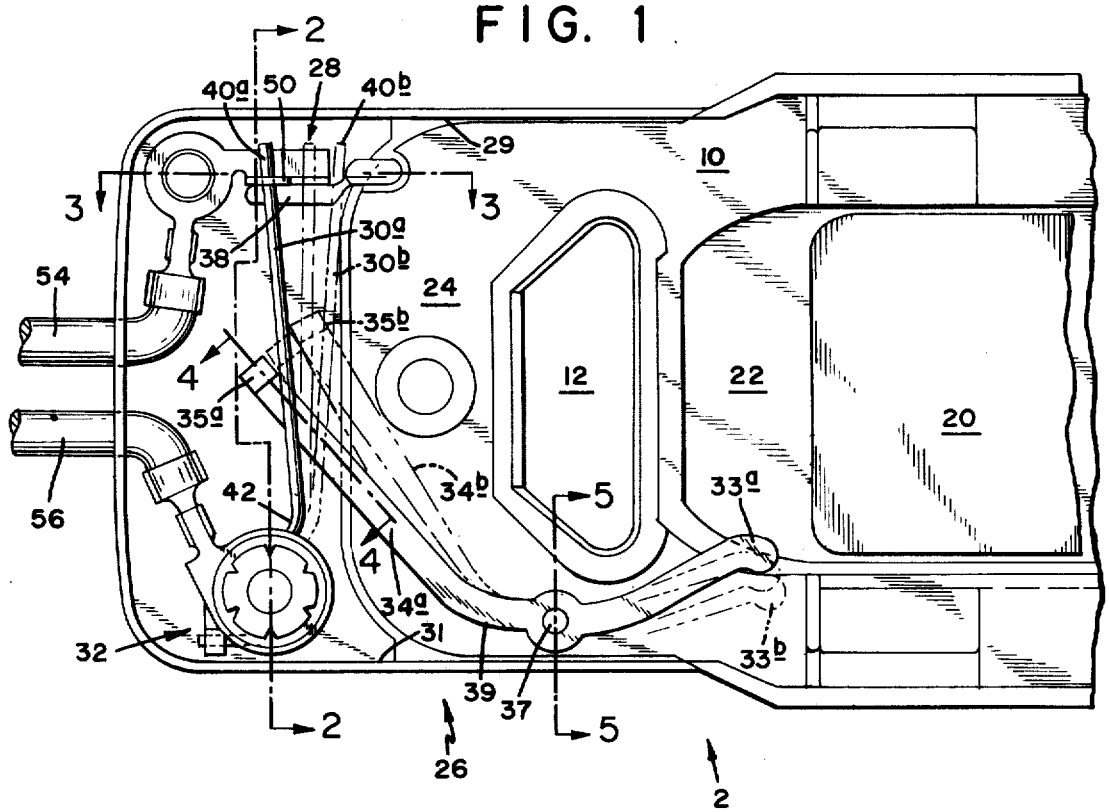
FIG. 1 is an enlarged top plan view of a safety belt buckle, revealing interior components thereof, including the electric switch of the present invention.

The buckle, referred to generally by the numeral 2, includes a housing 10. Referring to FIG. 1, the housing 10 has connecting means 12, such as an opening therein, for connecting the housing 10 to the seat belt. The housing 10 is formed of a plurality of laminated plates, such as a top plate 14, a bottom plate 16, and a center plate.

In such a safety belt buckle 2 of the type including a housing 10 and a tongue 20 adapted to be inserted into the housing 10, the housing 10 also has a tongue cavity 22 and a switch cavity 24. The electric switch of the present invention is disposed in the switch cavity 24.

Referring to FIG. 1, the electric switch is referred to generally by the numeral 26. The electric switch 26 is disposed in the switch cavity 24 and includes: a stationary first contact member referred to generally by the numeral 28; a movable second contact member 30; a biasing means, referred to generally by the numeral 32, for the second contact member 30; and an actuating member 34.

Figure 3:
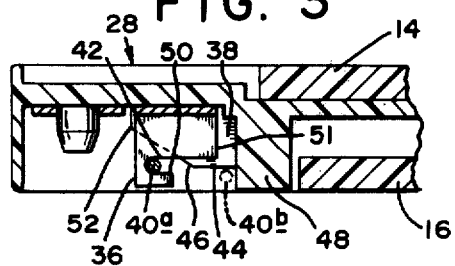
FIG. 3 is a cross-section of a portion of FIG. 1 taken along line 3—3 in FIG. 1.

Referring to FIG. 3, the stationary first contact member 28 includes an electrically conductive portion 36 and an electrically non-conductive portion 38. The movable second contact member 34 is an elongated, resilient, flexible, spring having a movable contact end portion 40 and a stationary mounting end portion 42. Preferably, the second contact member 30 has a circular cross-section, shown in FIG. 3. Referring to FIG. 3, the electric switch 26 has a normally closed position when the contact end portion 40 of the second contact member 30 is in electrical and mechanical contact with the conductive portion 36 of the first contact member 28. The electric switch 26 has an open position when the contact end portion 40 of the second contact member 30 is spaced apart from and not in contact with the conductive portion 36 of the first contact member 28, but instead is in contact with the non-conductive portion 38. In its closed position, the second contact member 30 is designated as 30a and its contact end portion 40 is designated as 40a. In its open position, the second contact member 30 is designated as 30b and its contact end portion 40 is designated as 40b. The biasing means 32 biases the second contact member 30 to the closed position of the electric switch 26.

Referring to FIG. 1, the switch cavity 24 in which the electric switch 26 is disposed has a front, a rear, a first side 29, and a second side 31. The front of the switch cavity 24 is located adjacent to the connecting means 12 where the buckle is attached to a safety belt (not shown). The rear of the switch cavity 24 is located at the opposite end of the switch cavity 24 from the front. The first side 29 and the second side 31 of the switch cavity 24 are located opposite one another and between the front and the rear of the switch cavity 24.

The first contact member 28 is disposed adjacent to and, preferably, on the first side 29 of the switch cavity 24. The stationary mounting end portion 42 of the second contact member 30 is mounted adjacent to the second side 31 of the switch cavity 24. A portion of the second contact member 30 including the contact end portion 40 extends across the switch cavity 24 to a point adjacent to the first side of the switch cavity 24.

Figure 4:
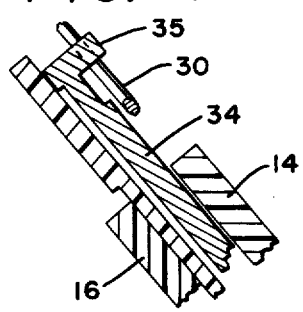
FIG. 4 is a cross-section of a portion of FIG. 1 taken along line 4—4 in FIG. 1.
Figure 5:
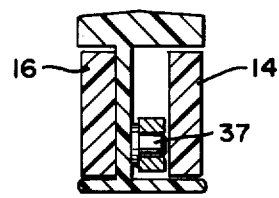
FIG. 5 is a cross-section of a portion of FIG. 1 taken along line 5—5 in FIG. 1.

Referring to FIG. 1, the actuating member 34 is a lever 34 having an elongated shape, a tongue end 33, a switch end 35, and a pivot point 37 located between the tongue end 33 and the switch end 35. In its closed position, the tongue end 33 of the lever 34 is designated as 33a and its switch end 35 is designated as 35a. In its open position, the tongue end 33 is designated as 33b and its switch end 35 is designated as 35b. The lever 34 has a bend 39 in its middle portion thereof between 90° and 150°, and preferably approximately 135°. Preferably, the bend 39 is adjacent to the pivot point 37. The pivot point 37 of the lever is disposed adjacent to the second side of the switch cavity 24 and adjacent to the connecting means 12. The connecting means 12 is located between the tongue cavity 22 and the switch cavity 24. The tongue end 33 of the lever 34 extends to the tongue cavity 22 of the buckle 2. The switch end 35 of the lever 34 extends into the middle portion of the switch cavity 24. The second contact member 30 has a middle portion thereof. The switch end 35 of the lever 34 is connected to and engages the middle portion of the second contact member 30, as shown in FIG. 4. The lever 34 has a closed position 34a which corresponds to the closed position 30a of the second contact member 30 and the electric switch 26. The lever 34 has an open position 34b which corresponds to the open position 30b of the second contact member 30 and the electric switch 26. In its closed position 33a, the tongue end 33 of the lever 34 extends into the tongue cavity 22. The lever 34 is biased to its closed position 34a by the biasing means 32 of the second contact member. When the tongue 20 enters the tongue cavity 22 it contacts the tongue end 33a of the lever 34 and pushes the tongue end 33 out of the tongue cavity 22 to its open position 33b, moving the switch end 35 of the lever 34 to its open position 35b, moving the second contact member 30 to its open position 30b.

Figure 2:
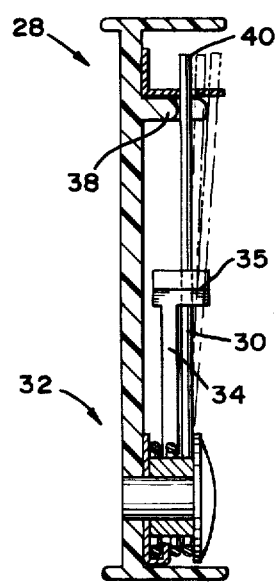
FIG. 2 is a cross-section of a portion of FIG. 1 taken along line 2—2 in FIG. 1.

Referring to FIG. 2, the biasing means 32 may be a spiral spring attached to, and preferably integral with, the stationary end of the second contact member.

Referring to FIGS. 1 and 3, the electrically conductive portion 36 of the first contact member has a guide edge 42 in a first plane substantially parallel to the planar surfaces of the buckle 2 and substantially parallel to the plane in which the tongue 22 moves when the tongue 22 enters and leaves the buckle 2. The non-conductive portion 38 also has a guide edge 44 in a second plane which is also parallel to the planar surfaces of the buckle 2 and parallel to the plane in which the tongue 22 moves when entering and leaving the buckle 2. The second plane and the planar edge 44 of the non-conductive portion 38 is located at a lower elevation than the first plane and the planar edge 42 of the conductive portion 36. The non-conductive portion 38 also has an inclined guide edge 46. The inclined edge 46 is in a third plane which is inclined at an angle to the first planar edge 42 of the conductive portion 36 and the second planar edge 44 of the non-conductive portion 38.

As a result, the contact end portion 40 of the second contact member 30 has motion in three planes. When the contact end portion 40a is in its closed position and begins movement toward its open position, the contact end portion 40 moves in a first plane along the first planar edge 42 of the conductive portion 36. When the contact end portion 40 encounters the inclined edge 46 of the non-conductive portion 38, the contact end portion 40 moves downwardly along the inclined edge 46 to the second planar edge 44 of the non-conductive portion 38. Then, contact end portion 40 of the second contact member 30 moves along the planar edge 44 of the non-conductive portion 38 to its open position 40b. Movement of the contact end portion 40 is limited by a stop means, such as a block 48 adjacent to the open position 40b of the contact end portion 40, and by a stop means, such as a hook 50 adjacent to, and preferably integral with, the conductive portion 36 at the closed position 40a of the contact end portion 40. When the contact end portion 40 is in its open position 40b and is moved to its closed position 40a, the contact end portion 40 moves along the planar edge 44 of the non-conductive portion 38, then up the inclined edge 46 of the non-conductive portion 38 until the contact end portion 40 encounters the first planar edge 42 of the conductive portion 36. Thus, the contact end portion 40 moves through three separate planes, a first plane in which it is guided by the first planar edge 42 of the conductive portion 36, a second plane in which it is guided by the second planar edge 44 of the non-conductive portion 38, and a third inclined plane in which it is guided by the inclined edge 46 of the non-conductive portion 38.

The electric switch 26 has means, described subsequently herein, by which the contact end portion 40 of the second contact member 30 makes a wiping and self-cleaning contact with at least a part of the first contact member 28 when the contact end portion moves between its closed position and its open position.

Referring to FIG. 3, the means for making a wiping, self-cleaning contact includes the conductive portion 36 and the non-conductive portion 38. The means for making a wiping, self-cleaning contact also includes the guide edge 42 on the conductive portion 36, the inclined edge 46 on the non-conductive portion 38, and the guide edge 44 on the non-conductive portion 38. The non-conductive portion 38 has a front end 51 and a rear end 52. The front end 50 of the non-conductive portion 38 is closer to the front of the switch cavity 24 than the rear end 52. The inclined edge 46 slopes downwardly from the rear end 52 to the guide edge 44. The inclined edge 46 is arranged at an angle of less than 60° with the guide edges 42 and 44, and preferably about 30°. The contact end portion 40 slides along the edges 42, 46 and 44 during movement between its closed position and its open position, thereby making a wiping and self-cleaning contact. Such wiping and self-cleaning contact removes dirt and other matter which might otherwise interfere with electrical contact and helps to establish a positive, electrical and mechanical contact with the conductive portion 36.

In operation, the electrical switch of the present invention is normally closed. In its closed position, the second contact member is in contact with the electrically conductive portion 36 of the first contact member 28. When the tongue 20 enters the tongue cavity 22 of the buckle 2, it pivots the lever 34 about the pivot point 37, moving the second contact member 30 to its open position 30b.

One of the contact members, such as the first contact member 28, may be connected by an electric wire 54 to a source of electrical power. The other contact member, such as the second contact member 30, may be connected by an electric wire 56 to an indicator, such as a buzzer or light on a dashboard of the vehicle. When the tongue 22 is inserted in the buckle 2, the indicator is turned off, showing that the buckle and safety belt are in use.

The electric switch is adapted for use in a wide variety of buckles. It has a self-cleaning operation which reduces malfunctions resulting, for example, from dirt or other matter forming in the electrical contact area of the switch. It is small enough to fit in a limited space, is simple and economical to manufacture and assemble, and is durable in operation.

I claim:

1. A buckle comprising:
   a housing defining a switch cavity and a tongue cavity;
   an electric switch disposed in said switch cavity, said electric switch including a stationary first contact member, a movable second contact member, a biasing means for said second contact member, and an actuation member;
   said stationary first contact member having a conductive portion and a non-conductive portion;
   said second contact member having an elongated shape, a movable contact end portion and a stationary mounting end portion;
   said electric switch having a closed position when said contact end portion of said second contact member is in contact with said conductive portion of said first contact member and an open position when said contact end portion of said second contact member is in contact with said non-conductive portion of said first contact member, said biasing means biasing said second contact member to said closed position of said electric switch;
   said actuation member having a tongue end, a switch end, and a pivot point between said tongue end and said switch end, said tongue end extending adjacent to said tongue cavity, said switch end engaging said second contact member, said actuation member pivotable on said pivot point to move said contact end portion of said second contact member from said closed position to said open position of said electric switch.

2. The buckle according to claim 1 wherein at least said contact end portion of said second contact member has motion which includes motion in a plurality of planes when said second contact member is moving between said closed position of said electric switch and said open position of said electric switch.

3. The buckle according to claim 1 wherein: said contact end portion of said contact member has motion in a first plane, a second plane inclined at an angle to said first plane, and a third plane parallel to said first plane, when said contact end portion of said second contact member is moving between its closed position and its open position.

4. The buckle according to claim 1 wherein said electric switch has means by which said contact end portion of said second contact member makes a wiping and self-cleaning contact with said first contact member when said second contact member moves between its closed position and its open position.

5. The buckle according to claim 1 and further comprising: a guide edge on said first contact member to guide said contact end portion of the second contact member during motion between said closed position and said open position.

6. The buckle according to claim 1 wherein said electrically conductive portion comprises a first planar guide edge over which said contact end portion of said second contact member moves between said closed position and said open position.

7. The buckle according to claim 1 wherein said electrically non-conductive portion comprises a planar edge over which said contact end portion of said second contact member moves between said closed position and said open position.

8. The buckle according to claim 7 wherein said electrically non-conductive portion further comprises an edge inclined with respect to said second planar edge.

9. The buckle according to claim 1 wherein said first contact member has a first planar guide edge, a second planar guide edge, and an inclined guide edge over which said contact end portion of said second contact member moves between said closed position and said open position.

10. The buckle according to claim 1 wherein:
    said actuating member has an elongated shape and a bend in its middle portion adjacent to said pivot point.

11. The buckle according to claim 1 wherein:
    said biasing means for said second contact member is a coil spring disposed at said stationary mounting end portion of said second contact member and adjacent to said second side of said switch cavity and adjacent to said front of said switch cavity.

12. The buckle according to claim 1 wherein:
    said switch cavity has a front, a rear, a first side and a second side;
    said first contact member is disposed adjacent said first side of said switch cavity;
    said stationary mounting end portion of said second contact member is disposed adjacent to said second side of said switch cavity; and
    said second contact member extends across said switch cavity and said contact end portion of said second contact member is adjacent to said first side of said switch cavity and said first contact member.

13. In a safety belt buckle of the type including a tongue cavity and a switch cavity therein, the improvement comprising:
an electric switch disposed in said switch cavity, said electric switch including a stationary first contact member, a movable second contact member, a biasing means for said second contact member, and an actuation member engaging said second contact member and extending adjacent to said tongue cavity;
said stationary first contact member having a conductive portion and a non-conductive portion;
said second contact member being an elongated resilient, flexible, spring having a movable contact end portion and a stationary mounting end portion;
said electric switch having a closed position when said contact end portion of said second contact member is in contact with said conductive portion of said first contact member and an open position when said contact end portion of said second contact member is in contact with said non-conductive portion of said first contact member, said biasing means biasing said second contact member to the closed position of said electric switch;
at least said contact end portion of said second contact member having motion which includes motion in a plurality of planes when said second contact member is moving between said closed position of said electric switch and said open position of said electric switch;
said electric switch having means by which said contact end portion of said second contact member makes a wiping, self-cleaning contact with at least a part of said first contact member when said second contact member is moving between said closed position and said open position of said electric switch.

14. The buckle according to claim 1 wherein said actuation member is a lever having a switch end, a tongue end, and a pivot point between said switch end and said tongue end, said tongue end actuated by a tongue of said buckle when said tongue enters said tongue cavity of said buckle, pivoting said lever about said pivot point, moving said switch end of said lever, said switch end of said lever moving said second contact member from said closed position to said open position.

15. An electric switch comprising:
a stationary first contact member, a movable second contact member, a biasing means for said second contact member, and an actuation member;
said stationary first contact member having a conductive portion and a non-conductive portion;
said second contact member having an elongated shape, a movable contact end portion and a stationary mounting end portion;
said electric switch having a closed position when said contact end portion of said second contact member is in contact with said conductive portion of said first contact member and an open position when said contact end portion of said second contact member is in contact with said conductive portion of said first contact member, said biasing means biasing said second contact member to said closed position of said electric switch;
said actuation member having an elongated shape, an actuation end, a switch end, and a pivot point between said tongue end and said switch end, said switch end engaging said second contact member, upon actuation said actuation member pivotable on said pivot point to move said contact end portion of said second contact member from said closed position to said open position of said electric switch.

16. The electric switch according to claim 15 wherein: said contact end portion of said contact member has motion in a first plane, a second plane inclined at an angle to said first plane, and a third plane parallel to said first plane, when said contact end portion of said second contact member is moving between its closed position and its open position.

17. The electric switch according to claim 15 wherein said first contact member has a first planar guide edge, a second planar guide edge, and an inclined guide edge over which said contact end portion of said second contact member moves between said closed position and said open position.

18. An electric switch comprising:
a stationary first contact member, a movable second contact member, a biasing means for said second contact member, and an actuation member engaging said second contact member;
said stationary first contact member having a conductive portion and a non-conductive portion;
said second contact member being an elongated resilient, flexible, spring having a movable contact end portion and a stationary mounting end portion;
said electric switch having a closed position when said contact end portion of said second contact member is in contact with said conductive portion of said first contact member and an open position when said contact end portion of said second contact member is in contact with said non-conductive portion of said first contact member, said biasing means biasing said second contact member to the closed position of said electric switch;
at least said contact end portion of said second contact member having motion which includes motion in a plurality of planes when said second contact member is moving between said closed position of said electric switch and said open position of said electric switch;
said electric switch having means by which said contact end portion of said second contact member makes a wiping, self-cleaning contact with at least a part of said first contact member when said second contact member is moving between said closed position and said open position of said electric switch.

* * * * *